US010558926B2

(12) United States Patent
Hsu

(10) Patent No.: US 10,558,926 B2
(45) Date of Patent: Feb. 11, 2020

(54) STATISTICAL PATTERN GENERATION FOR INFORMATION EXTRACTION

(71) Applicant: Academia Sinica, Taipei (TW)

(72) Inventor: Wen-lian Hsu, Taipei (TW)

(73) Assignee: ACADEMIA SINICA, Taipei (TW)

(*) Notice: Subject to any disclaimer, the term of this patent is extended or adjusted under 35 U.S.C. 154(b) by 726 days.

(21) Appl. No.: 14/947,002

(22) Filed: Nov. 20, 2015

(65) Prior Publication Data
US 2016/0148119 A1 May 26, 2016

Related U.S. Application Data

(60) Provisional application No. 62/082,252, filed on Nov. 20, 2014.

(51) Int. Cl.
G06N 5/04 (2006.01)
G06F 17/27 (2006.01)
G06N 5/02 (2006.01)

(52) U.S. Cl.
CPC ........... *G06N 5/047* (2013.01); *G06F 17/271* (2013.01); *G06F 17/2765* (2013.01); *G06F 17/2785* (2013.01); *G06N 5/027* (2013.01)

(58) Field of Classification Search
None
See application file for complete search history.

(56) References Cited

U.S. PATENT DOCUMENTS

| 6,882,970 B1* | 4/2005 | Garner | G06F 16/685 704/236 |
| 2002/0196679 A1* | 12/2002 | Lavi | G06F 17/277 365/200 |
| 2005/0055209 A1* | 3/2005 | Epstein | G10L 15/1815 704/255 |
| 2005/0075859 A1* | 4/2005 | Ramsey | G06F 17/2715 704/9 |

(Continued)

FOREIGN PATENT DOCUMENTS

WO  WO-03005347 A1 * 1/2003 ........... G10L 15/187

OTHER PUBLICATIONS

Sung, Cheng-Lung, Cheng-Wei Lee, Hsu-Chun Yen, and Wen-Lian Hsu. "An alignment-based surface pattern for a question answering system." In 2008 IEEE International Conference on Information Reuse and Integration, pp. 172-177. IEEE, 2008. (Year: 2008).*

(Continued)

*Primary Examiner* — Alexey Shmatov
*Assistant Examiner* — Casey R. Garner
(74) *Attorney, Agent, or Firm* — WPAT, PC

(57) ABSTRACT

An apparatus for extracting selected information from a set of symbols includes said alignment module is configured to retrieve test patterns from a symbol input, and to attempt alignment of test patterns with a canonical pattern. Successful alignment between a particular test pattern and said canonical pattern indicates of existence of information of interest in a particular candidate pattern. Upon detection of a successful alignment, the alignment module passes infor- (Continued)

mation concerning the test pattern to a user. Additionally, in response to detecting an unsuccessful attempt to align the first test pattern and the canonical pattern, said alignment module passes, to said user, information concerning the first test pattern.

8 Claims, 4 Drawing Sheets

(56) References Cited

U.S. PATENT DOCUMENTS

| | | | | |
|---|---|---|---|---|
| 2005/0108001 | A1* | 5/2005 | Aarskog | G06F 17/271 704/10 |
| 2007/0150275 | A1* | 6/2007 | Gamer | G06F 16/3343 704/235 |
| 2008/0077396 | A1* | 3/2008 | Hsu | G06F 17/273 704/10 |
| 2008/0221893 | A1* | 9/2008 | Kaiser | G09B 19/04 704/257 |
| 2008/0228769 | A1* | 9/2008 | Lita | G16H 50/20 |
| 2016/0364476 | A1* | 12/2016 | Curin | G06F 17/30684 |

OTHER PUBLICATIONS

Wen-Lian Hsu, "A Principle-Based Approach for Natural Language Processing: Eliminating the Shortcomings of Rule-Based Systems with Statistics", PACLIC 27 is held on Nov. 21-24, 2013. The abstract of a keynote speech gave by the, Inventor is presented at pp. 18-19.

Yung-Chun Chang et al., "Linguistic Template Extraction for Recognizing Reader-Emotion and Emotional Resonance Writing Assistance", published at Proceedings of the 53rd Annual Meeting of the Association for Computational Linguistics and the 7th International Joint Conference on Natural Language Processing (Short Papers), pp. 775-780, Beijing, China, Jul. 26-31, 2015.

Wen-Lian Hsu, "ISAAC 2015 International Symposium on Advanced and Applied Convergence", Nov. 12, 2015, Seoul, The Inventor gave a keynote speech on the second day, Nov. 13, 2015.

* cited by examiner

| FRAME | HIGH PROBABILITY EXEMPLARS |
|---|---|
| $V:I:P$ | Vol. 38, no. 2, pp. 115--126<br>Volume 38, suppl 2, p. 11--126<br>38, 2, 115--126<br>38(2):115--126<br>38(2:115--126<br>38,2, 115-126<br>38 115--126<br>38,, 2,,, 115--126<br>38:2:115--126<br>38$ 2, 115-126<br>38 2# 115-126 |

| FRAME | LOW PROBABILITY EXEMPLARS |
|---|---|
| $V:I:P$ | 38 people ate 115 to 126 oysters<br><br>At age 38, she weighed 115-126 lbs<br><br>38 times 115 is greater than 126 |

STATISTICAL PATTERN GENERATION FOR INFORMATION EXTRACTION

RELATED APPLICATIONS

Under 35 USC 119, this application claims the benefit of the Nov. 20, 2014 priority date of U.S. Provisional application 62/082,252, the contents of which are herein incorporated by reference.

FIELD OF INVENTION

This invention relates to robotic information processing, and in particular, to robotic mining for information in symbol sources.

BACKGROUND

In many symbol sets, there are many ways to communicate the same information. For example, a particular location within a codex might be expressed as "page X, line Y," "p. X, l. Y," or "pg. X; li, Y." Yet, as different as these are, they all mean the same thing: a particular location of certain text within a codex.

A human being generally has little difficulty in coping with having so many different ways to say the same thing. To a human, this task is natural. It is so deeply embedded in his functioning that, if asked exactly how he does it, he will most likely be unable to offer a clear answer.

This lack of consistency in expression, however, poses difficulty for information-mining robots. As an information-mining robot automatically reads symbols in search of information, it inevitably encounters different ways of communicating the same information. Such a robot must be taught to understand, for example, that "page X, line Y" and "p. X, l. Y" mean the same thing.

An obvious way to solve this problem is the brute force approach. For example, one can simply tell the robot about each possible way of expressing a location in a symbol set. Armed with such a list, a robot that encounters an unknown pattern of symbols can compare it with each such pre-programmed expression to see if it fits.

This approach has certain disadvantages. First of all, the process becomes more time-consuming as the list of alternatives becomes longer. Secondly, a great deal of programming is required.

SUMMARY

In one aspect, the invention features an apparatus for extracting selected information from a set of symbols. Such an apparatus includes a processor, a frame memory that stores a frame having information indicative of a canonical pattern that is indicative of the selected information, and a program memory that stores an alignment module. The alignment module retrieves test patterns from a symbol input, and attempts to align the test patterns with the canonical pattern. A successful alignment between a particular test pattern and the canonical pattern indicates existence of the information of interest in the particular candidate pattern. Upon detection of a successful alignment, the alignment module passes, to the user, information concerning the test pattern. In operation, the alignment module retrieves a first test pattern, attempts to align the first test pattern and the canonical pattern, and fails. In response to detecting this failure, the alignment module then passes, to the user, information concerning the first test pattern in the same way it would have had the alignment not failed.

Embodiments include those in which the alignment module detects an extent of misalignment and decides to pass or not pass such information to the user based on this extent.

In some embodiments, the alignment module retrieves a second test pattern, detects an unsuccessful attempt to align the second test pattern and the canonical pattern, and avoids passing, to the user, information concerning the second test pattern.

In other embodiments, the alignment module retrieves a second test pattern, and instead detects a successful alignment between the second test pattern and the canonical pattern. The alignment module then passes, to the user, information concerning the second test pattern.

Embodiments include those in which the alignment module calculates an alignment score indicative of an extent to which the first test pattern and the canonical pattern fail to align. This alignment score can be used as a basis for deciding whether or not to treat the misaligned test pattern as if it had in fact been correctly aligned.

Among the embodiments are those in which the first test pattern includes a union of a first set of units and a second set of units, but the canonical pattern only has the first set of units. This first set of units contains units that are missing from the second set of units. In this embodiment, the alignment module calculates an alignment score that depends at least in part on the second set.

In other embodiments, the canonical pattern includes a union of first and second sets of units. In this embodiment, the first test pattern consists of only the first set of units. However, the first set also contains units that are missing from the second set. In these embodiments, the alignment module calculates an alignment score that depends at least in part on the second set.

In other embodiments, the canonical pattern includes a first unit and the first test pattern includes the first unit and a second unit adjacent to the first unit. The first and second adjacent units thus define a bigram. In these embodiments, the alignment module calculates an alignment score that depends at least in part on a frequency of the bigram in training data.

In yet other embodiments, the canonical pattern includes first, and second units that are adjacent to each other. The first test pattern includes the first and second units, together with a third unit. The third unit is adjacent to both the first and second units. The first, second, and third units collectively define a trigram. In this embodiment, the alignment module calculates an alignment score that depends at least in part on a frequency of the trigram in training data.

In other embodiments, the alignment module calculates an alignment score indicative of a frequency of occurrence of the misalignment in training data.

Among the embodiments are those in which the frame includes at least one frame-slot that has information concerning context of the canonical pattern. An example of such a frame-slot is a topic slot indicative of a topic that is used as a basis for disqualifying the canonical pattern from being associated with a training pattern.

All of the foregoing embodiments include variants in which the units are semantic units and other variants in which the units are syntactic units. Semantic units can be, for example, words or groups of words in text or in a spoken utterance that represents text. Syntactic units can be, for example, grammatical units such as predicates, subjects, verbs, adjectives, adverbs, prepositional phrases, main and subordinate clauses, articles, and the like.

The frame memory and the program memory are tangible and non-transitory media that are in data communication with the processor. The apparatus as claimed is made of tangible and non-transitory matter that, in operation, generates waste heat and causes transformation of matter by causing voltage-induced interaction with charged leptons within the matter.

DESCRIPTION OF THE DRAWINGS

These and other features of the invention will be apparent from the following detailed description and the accompanying figures, in which.

DETAILED DESCRIPTION

Figure 1:
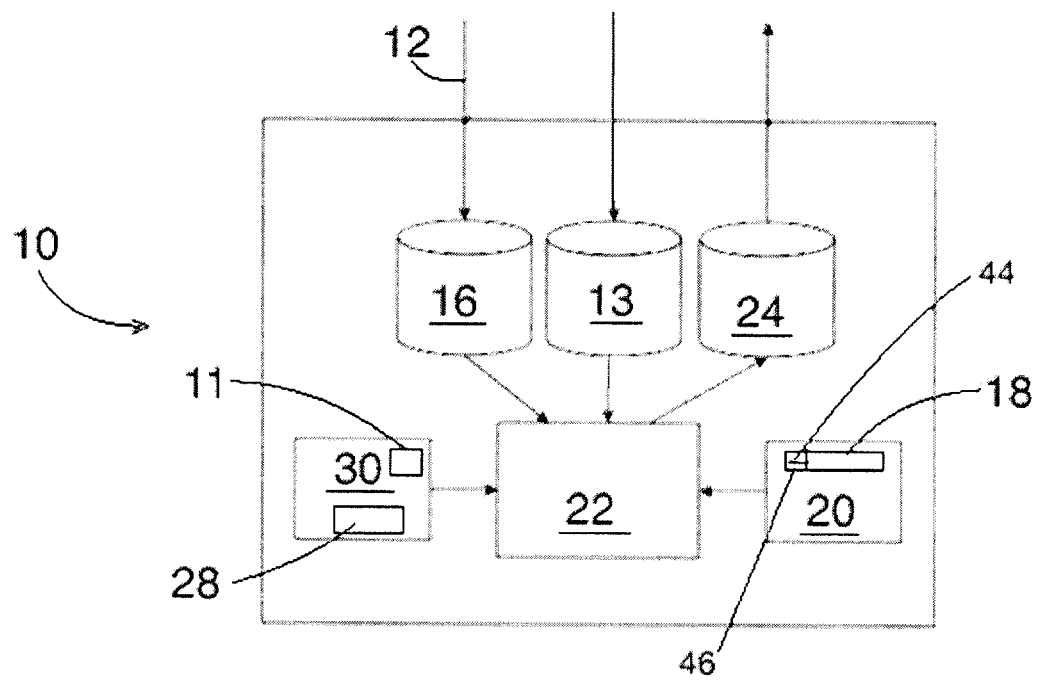
FIG. 1 shows components of an apparatus for carrying out the invention.

FIG. 1 shows computer-implemented symbol-processing system 10 that accepts source data 12 and stores it in a source-data store 16. In a typical application, the source data 12 represents a symbol set. An example of a symbol set is natural language either in the form of text or in the form of spoken utterance that can be converted to text using automatic speech recognition.

Generally, the processing of the source data executes on a processor that is controlled by software instructions stored in a non-volatile program memory. This processing makes use of data representations of one or more frames that are stored in a frame memory. The program memory and the frame memory may be in different regions of a general purpose memory of the computer.

The source data 12 contains information of interest to a user. The purpose of the symbol processing system 10 is to extract this information from the source data 12.

In many symbol sets, there are often patterns that can be used to identify certain kinds of information. The symbol-processing system 10 exploits these patterns in an effort to extract this information. These patterns can be learned by using a taxonomy module 11 that inspects and characterizes training data 13 that has been suitably annotated by a human annotator.

In operation, a user specifies the information of interest. This information is associated with a canonical pattern 34 represented as a frame 18 stored in a frame memory 20.

A canonical pattern 34 includes a sequence of units. These units can be semantic units or syntactic units.

As used herein, a "semantic unit" is a unit that conveys meaning. Examples of a semantic unit are words. However, a semantic unit may be a combination of words. For example, the combination "Tower Bridge" conveys a meaning that is distinctly different from its constituent words. It should be noted that both "tower" and "bridge" are semantic units in their own right. Thus, a semantic unit can have constituents that are themselves semantic units. As a result, the procedures described herein are inherently prone to recursion when necessary.

As used herein, a "syntactic unit" is a grammatical construct that does not have semantic content. Examples are parts of speech, nouns, verbs, predicates, adjectives, adverbs, phrases, including prepositional phrases, and clauses, including both main and subordinate clauses.

To the extent the description refers specifically to semantic units, it should be understood that syntactic units can also be used.

In addition to holding a canonical pattern 34, a frame 18 further includes frame-slots 44 for holding other information. These frame-slots 44 include a topic slot 46 that indicates subject matter that the semantic units are to be associated with. Thus, a frame 18 is not restricted to defining a region within a space of semantic units. Instead, the frame 18 can be viewed as defining a region of a multi-dimensional space in which the semantic units are associated with a particular subspace. The availability of frame-slots 44 enables the frame to represent a region in such a higher-dimensional space.

To identify information of interest, a processor 22 retrieves the relevant frame 18 from the frame memory 20 and compares the source data 12 with the canonical pattern 34 stored in the frame 18. If there is a match, the processor 22 will indicate that information of interest has been found and store such information in a result data-store 24 to be made available to the user. On the other hand, if there is no match, then in some cases, the processor 22 will nevertheless indicate that information of interest has been found and stores such information in the result data-store 24 anyway.

Figure 2:
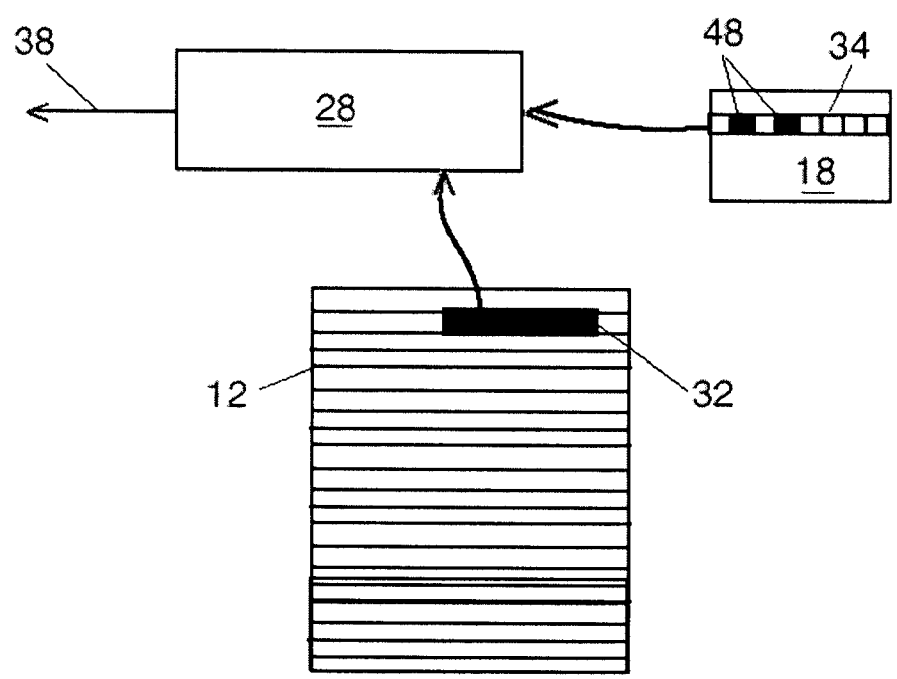
FIG. 2 shows an alignment module from the apparatus shown in FIG. 1.

To identify information of interest, the processor 22 executes an alignment module 28 stored in a program memory 30. Referring to FIG. 2, the alignment module 28 compares a test pattern 32 from the source data 12 with the canonical pattern 34 from a frame 18. In some cases, the alignment module 28 finds that the test pattern 32 and the canonical pattern 34 match exactly. More generally, the alignment module 28 may find test patterns 32 that almost match. The extent to which they match is reflected in an alignment score 38 provided by the alignment module 28.

Figure 3:
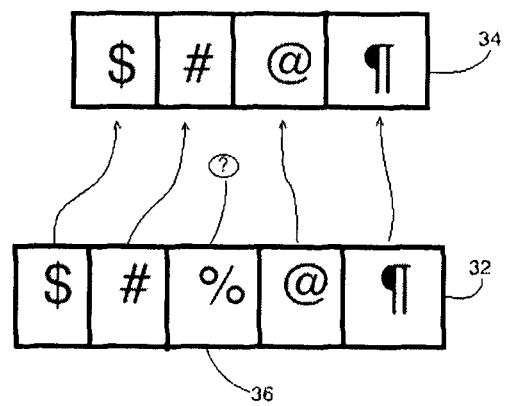
FIGS. 3 and 4 illustrate insertions and deletions.
Figure 4:
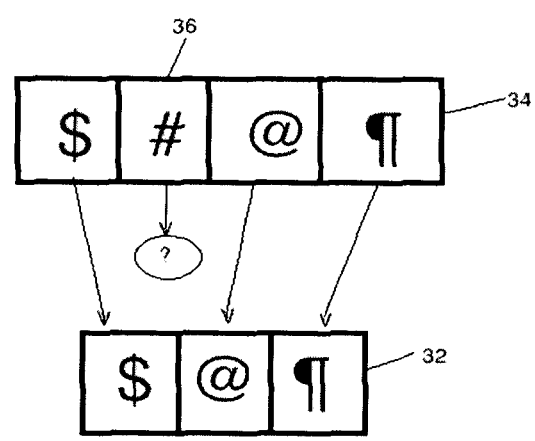

In some cases, the test pattern 32 may include material 36 that is not part of the canonical pattern 34. This type of mismatch, an example of which is shown in FIG. 3, is called an "insertion." Alternatively, as shown in FIG. 4, the canonical pattern 34 may include some material 36 that is not part of the test pattern 32. This type of mismatch is called a "deletion." It should be noted that the terms "insertion" and "deletion" do not necessarily mean that an act of insertion or deletion has actually occurred. These are simply convenient words to express the relationship between the test pattern 32 and the canonical pattern 34.

In cases where a mismatch of the type shown in FIGS. 3 and 4 exist, it is possible for the mismatch to be an insignificant mismatch. Thus, for each mismatch, there exists a likelihood that the test pattern 32 identifies information of interest, even though it does not match the canonical pattern 34. For a given mismatch, if there is a high likelihood that the test pattern 32 will lead to information of interest even given the mismatch, then the mismatch will be deemed "insignificant." In that case, the alignment score 38 will indicate a likelihood that the test pattern 32 leads to information of interest. Information on such likelihoods can be derived by having the processor 22 execute the taxonomy module 11 for statistical characterization of training data 13.

Exactly what "sufficiently high" would be is the user's choice. In general, the user would have a desired false alarm rate and leakage rate. A false alarm occurs when a mismatch is deemed insignificant and the test pattern 32 turns out to be undesirable. A leakage occurs when a mismatch is deemed significant and the test pattern 32 turns out to have been of value. By adjusting a user-defined threshold, the user can trade false alarm for leakage and vice versa.

Once such statistical characterization is complete, the alignment module 28 inspects the test pattern 32 and outputs an alignment score 38 indicative of how likely it is that the test pattern 32 identifies information of interest notwithstanding its failure to actually match the canonical pattern 34 in the frame 18.

A variety of ways can be used to statistically characterize training data 13. One particularly reliable method involves identifying the probability of a bigram. A bigram consists of two adjacent semantic units.

Throughout this specification, a semantic unit will be represented as a letter or character. However, it is to be understood that this is a mere abstraction that is used only for convenience of exposition.

For example, suppose there are three canonical patterns 34: "ABCD," "ABE," and "AFC," where each letter represents a semantic unit. Suppose the test pattern 32 is "ABXE." Clearly, the test pattern "ABXE" does not match any of the canonical patterns 34. However, but for the insertion of an "X", the test pattern "ABXE" would have matched the canonical pattern 34 "ABE." Whether or not the mismatch is significant might depend on a frequency of "BX" and a frequency of "XE" in correctly matching patterns. These frequencies are bigram frequencies that the taxonomy module 11 extracts from the training data 13. A bigram frequency is thus the likelihood that a first semantic unit will be inserted adjacent to second semantic unit. Naturally, there are two distinct bigram frequencies depending on whether the first semantic unit is inserted before or after the second semantic unit. For a particular application, the alignment module 28 selects the appropriate one of these two bigram frequencies.

In some cases, the procedure includes statistically characterizing the likelihood of forming a particular trigram. This is the likelihood that a particular pair of semantic units will be inserted between before or after a particular semantic unit.

A similar technique can be applied in the case of deletions. For example, if the test pattern 32 is "ABD", then once again the test pattern 32 does not match any of the above canonical patterns 34. However, but for the deletion of "C", the test pattern 32 would have matched the canonical pattern 34 "ABCD." Whether or not this mismatched should be deemed insignificant would then depend on the frequency that a "C" following a "B" would be deleted. Again, the taxonomy module 11 would have derived this probability from the training data 13.

In some practices, when the test pattern 32 differs from the canonical pattern 34 as a result of some combination of deletions and insertions, the insertions and deletions are assumed to be independent. As a result, the probability of a mismatch between such a test pattern 32 and a canonical pattern 34 is a product of the individual probabilities of each insertion and deletion. However, it should be apparent that as the number of insertions and deletions increases, the probability decreases fairly quickly.

In other practices, a deletion or insertion either increments or decrements a score.

As an example, consider a case where the canonical pattern 34 consists of the four semantic units "ABCD." Based on this, one can define a 4-dimensional weight vector, such as [2 1 1 2]. Then, for a given test pattern 32, one can define a 4-dimensional match vector indicating which of these the alignment module 28 has matched. For instance, given a test pattern "ABD," the alignment module 28 would generate a match vector [1 1 0 1]. The inner product of the weight vector and the match vector would then define a baseline score 37. Note that the weights do not have to be the same for each semantic unit. For example, in the given weight vector, matching the semantic units "A" and "D" is considered more important than matching the semantic units "B" and "C."

The above method automatically adjusts the base-line score 37 for any deleted semantic unit. The extent to which the base-line score 37 is reduced is simply the particular weight from the weight vector that corresponds to the deleted semantic unit.

An insertion necessarily results in at least one bigram. For example, if the test pattern 32 is "AXBCD", then the insertion "X" creates two bigrams: "AX" and "XB". For each of these, the taxonomy module 11 will have derived from the training data 13 information on the relative frequencies with which those combinations occur in the training data 13. These relative frequencies are used as a basis for generating a combination score 39 that can then be used to adjust the base-line score 37 to accommodate the insertion.

Figures 5, 6:
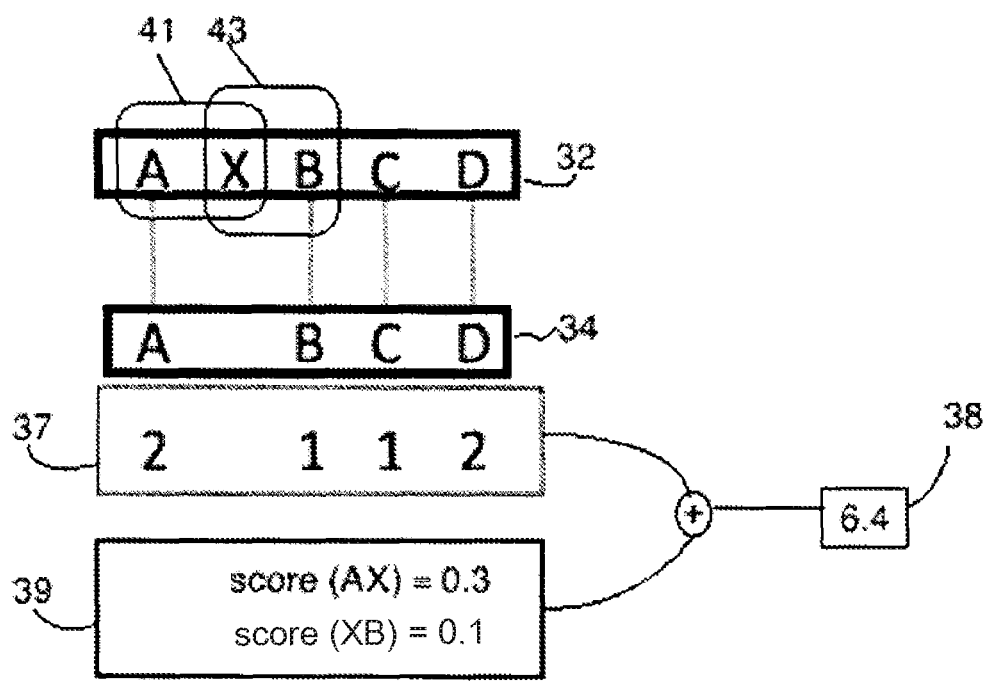
FIG. 5 illustrates a scoring method.
FIGS. 6 and 7 show examples of high and low probability exemplars for a particular example.

FIG. 5 shows a specific example of the foregoing two-stage scoring method as applied to match the canonical pattern 34 is "ABCD" and the test pattern 32 is "AXBCD."

The alignment score 38 is a sum of a base-line score 37 and a combination score 39.

The first step is to determine the base-line score 37. This is obtained by using the weight-vector [2 1 1 2]. Note that these numbers are for example only. In the illustrated example, the dimensionality of the weight vector is the number of semantic units in the canonical pattern 34.

The next step is to determine the combination score 39. This represents a contribution indicative of the frequencies of the first and second bigrams 41, 43 formed by the insertion of "X." These two bigrams are "AX" and "XB." The frequencies associated with the first and second bigrams 41, 43 are obtained from analysis of the training data 13. The mapping from frequency to score is set by a user. The alignment score 38, as shown in FIG. 5, is the sum of the combination score 39 and the base-line score 37.

In some cases, certain bigrams are so rare that one may wish to assign negative scores to them. This may result in a negative combination score 39. Depending on the magnitude of these negative scores, a match may be effectively forbidden by the presence of these bigrams.

In some cases, certain semantic units are so important that the alignment module 28 deems them to have effectively infinite weight. This leads to the idea of an index key 48. For a particular canonical pattern 34, an index key 48 is a subset of the canonical pattern's semantic units. Naturally, there are many possible subsets. Hence, a particular canonical pattern 34 can have many different index keys 48. The combination of semantic units defined by one of these subsets is considered so important that unless a test pattern 32 matches the combination in at least one of those subsets, the alignment module 28 simply disqualifies it from further consideration.

In general, given a particular canonical pattern 34, it is time-consuming to perform this matching process on every possible test pattern 32. The use of an index key 48 to quickly dispose of many test patterns 32 thus significantly reduces the time required to extract relevant information from the body of symbols.

As an example, consider the problem of identifying a reference to a volume, issue, and page. In general, one is looking for the occurrence of three integers. This canonical pattern 34 "V:I:P" is stored in a frame, as shown in FIGS. 6 and 7.

In many cases, there will inevitably be variations in how volume, issue, and page are expressed. Some of these variations are shown in FIG. 4. These represent likely exemplars of the canonical pattern 34 in the frame. As such, these are test patterns 32 that are likely to lead to information of interest. After analyzing training data 13 using a method described in more detail below, it was discovered that certain patterns are likely to mean a volume, issue, and page. These likely patterns are shown in FIG. 6.

However, not all sequences of three integers are likely to lead to information of interest. FIG. 7 shows additional exemplars. However, it is quite clear that these exemplars have nothing to do with volume, issue, and page. Thus, even though they do fit the underlying frame, these exemplars are less likely to lead to information of interest.

Figures 7, 8:
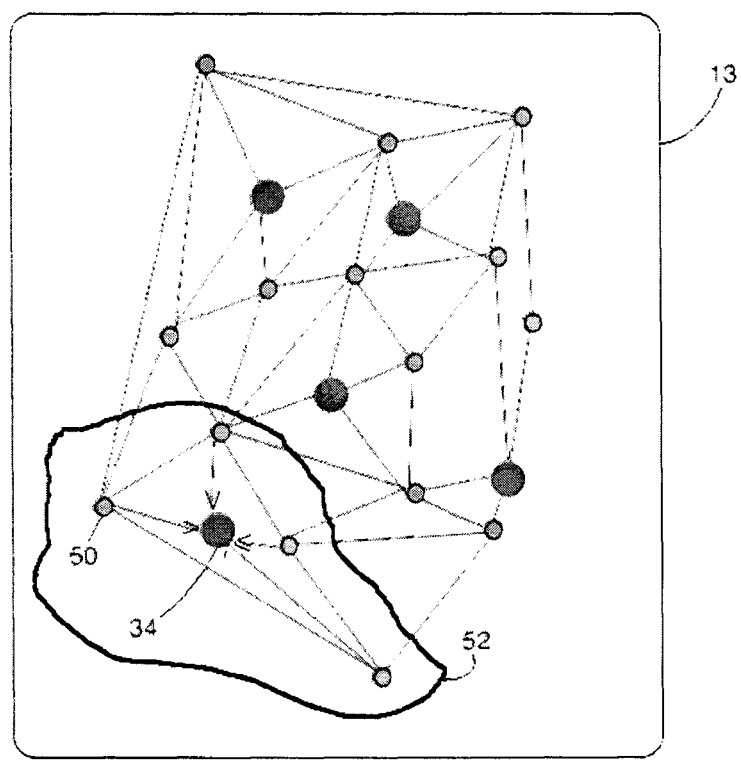
FIG. 8 shows a training set having a spanning set.

The examples shown in FIG. 7 illustrate how frame-slots 44 enhance a system's ability to avoid time-wasting efforts aligning a canonical pattern 34 with a test pattern 32 that is clearly unrelated. For example, if a frame 18 storing the canonical pattern 34 had a frame-slot 44 indicative of a general topic associated with the canonical pattern 34, then a mismatch between that frame-slot 44 and corresponding information concerning the test pattern 32 would enable the test pattern 32 to be summarily excluded from further consideration.

The statistical measurement of mismatch between canonical pattern 34 and test pattern 32 has applications other than data mining, as described herein. For example, one who writes prose may inadvertently drift from norms of style or grammar. These norms can be represented as canonical patterns 34, and the writer's sentences can correspond to test patterns 32. most grammatical errors are a result of a writer straying too far from some kind of canonical form that defines grammatical correctness.

For example, in writing about the retirement party for a White House spokesman who has served many years, a journalist may carelessly refer to "a gathering to honor White House old spokesman Elias Elastomére." The system 10 may detect that this phrase corresponds to the canonical pattern 34 "White House spokesman" with the insertion of the semantic unit "old." The system 10 will then recognize that, based on training data 13, that the bigrams "House old" and "old spokesman" are low-frequency bigrams. It may inspect a list of higher-frequency bigrams and suggest one that uses the more likely adjectives "veteran" or "senior." In that case, the journalist could be prompted to replace the text with something more suitable, such as "a gathering to honor White House veteran spokesman Elias Elastomére" or perhaps "a gathering to honor White House senior spokesman Elias Elastomére."

Additionally, the techniques set forth herein, in which one relies on statistical methods to determine how close a particular test pattern 32 is to some canonical pattern 34, are applicable to any sequence of symbols in general. This should be readily apparent since many of the figures use arbitrary letters to represent semantic units. However, there is no particular reason these letters represent semantic units. They could just as easily represent syntactic units, procedural steps, or events.

The training data 13 is typically tagged by a human annotator to facilitate the extraction of canonical patterns 34 from the training data 13, as described in more detail below. This process requires identifying what genus particular semantic units or combinations thereof are found in the training data 13.

As an example, suppose an annotator encounters the phrase "White House spokesman Elias Elastomére said that . . . " The annotator might then recognize that "White House" is a species of the genus "organization," that "spokesman" is a species of the genus "title," and that "Elias Elastomére" is a species of the genus of "person." In that case, the phrase "White House spokesman Elias Elastomére" would be tagged as a particular incarnation of the more general canonical pattern 34 of the form "organization: title:person" stored in a frame 18 entitled "organization_staff."

In some cases, it is possible to use the fact that certain genera are likely to occur together to improve this tagging process. For example, it may have been found, through statistical analysis of the training data 13, that when the genus "title" and "person" occur together, it is very likely that the genus "organization" will be present. This pair of genera thus defines a key 48 that can be used as a frame index for the frame "organization_staff." Thus, if the system 10 encounters a test pattern 32 in which this key 48 is present, it will recognized that it would be useful to retrieve the frame "organization_staff" and perform an alignment procedure using the particular test pattern 32 and the canonical pattern 34 in the frame "organization_staff."

Naturally, there is no guarantee that the frame "organization_staff" is the only frame that involves these three genera. There may be others. Among the tasks of the alignment module 28 is to pick out the one that is most probably correct based on the alignment score 38 already described herein.

The foregoing logic is also applicable in reverse. For example, if a particular test pattern 32 includes the key 48 stored in a frame index of a particular frame 18, it may be quite likely that that frame 18 is the correct frame for the test pattern 32, even though the test pattern 32 may be missing one or more of the semantic units in the frame's canonical pattern 34.

For example, the occurrence of the genera "title" and "person" together in a particular test pattern 32, i.e. the "collocation" of these genera, will very often indicate that the correct canonical pattern 34 for that test pattern 32 is in fact the one found in the frame "organization_staff." As an example, if one sees the semantic units "spokesman Elias Elastomére" out of context, even without an organization name nearby, it is fairly clear that one is looking at a member of an organizational staff of some unspecified organization. Therefore, it would not be at all unreasonable to classify that test pattern 32 corresponding to the frame "organization_staff." The frame index can thus be used as a basis for identifying deletions that will affect the alignment score 38.

The same sort of statistical frequency analysis can be used to identify insertions that are not inconsistent with a test pattern 32 being correctly mapped to a particular canonical pattern 34. For example, statistical analysis of training data 13 may reveal that certain adjectives are not uncommon before a title. Examples of such adjectives are "veteran," "senior," "disgraced," or "recently-appointed." The presence of these adjectives could then be associated with a relatively high combination score 39. On the other hand, certain other adjectives such as "equine" or "viscous" do not commonly occur before "spokesman." If detected in a test pattern 32 these would contribute relatively low or even negative combination scores 39 to the overall alignment score 38.

Ultimately, the task of the system is, given a particular test pattern 32, to answer the question, "Which canonical pattern 34 is most closely associated with this test pattern 32?" However, this raises the question, "How is the set of canonical patterns 34 to be determined?"

In general, the taxonomy module 11 creates canonical patterns 34 by taxonomizing the training data 13.

Referring to FIG. 8, the training data 13 ultimately consists of a great many training patterns 50. In general, it is possible to identify, from this large set of training patterns 50, a smaller set that have certain features in common. This smaller set is thus a genus 52 of patterns. Although the individual training patterns 50 of a genus are not the same, they are close enough to being the same so that one can organize them together to form a genus 52. The essential characteristics of a genus 52 are embodied in the canonical pattern 34.

The taxonomy module 11 thus starts with unorganized training data 13 made of individual training patterns 50 and organizes these into a set of genera 52. It then associates, with each genus 52, a canonical pattern 34.

FIG. 8 models the outcome of what the taxonomy module 11 carries out. In effect, the taxonomy module 11 uses the training patterns 50 as a basis for identifying canonical patterns 34, and then ties the training patterns 50 to the relevant canonical patterns 34 to form the directed graph shown in FIG. 8. In this graph, the nodes correspond to patterns. The edges are directed towards the dominating, or canonical pattern 34. Each canonical pattern 34 thus dominates one or more, the more the better, training patterns 50.

To decide whether one pattern dominates another, one carries out the same alignment procedure as already discussed above in connection with aligning a canonical pattern 34 to a test pattern 32. One chooses first and second training patterns 50, casts the first training pattern in the role of the canonical pattern, executes the same alignment procedure, and evaluates the resulting alignment score 38. If the alignment score 38 is above a pre-selected threshold, then the first training pattern is deemed to have "dominated" the second training pattern 50. In the context of FIG. 8, this spawns a directed edge from the second training pattern to the first training pattern.

After having executed this alignment procedure to many pairs of training patterns 50, a subset of those training patterns 50 will begin to emerge. This subset, which will be referred to as a "spanning set," has the property that the spanning set as a whole dominates most of the training patterns 50. Each member of that spanning set can then be designated as one of a set of "canonical patterns." The training patterns 50 that the newly-minted canonical pattern 34 dominates then define the genus 52 corresponding to that canonical pattern 34. The result will be the directed graph shown in FIG. 8.

In some practices of the method, the canonical patterns 34 that ultimately make up the spanning set do not have to have been selected from the training data 13. It is quite possible to simply synthesize canonical patterns 34 and include such synthesized canonical patterns 34 within a spanning set.

In theory, given a set of training patterns 50, there can be many different spanning sets. Of these spanning sets, there are spanning sets that have the property that they have fewer canonical patterns 34 than other spanning sets. However, finding these optimal spanning set is an NP hard problem. Therefore, instead of trying to find one, the taxonomy module 11 only tries to approximate one.

To approximate the optimal spanning set, the taxonomy module 11 constructs a spanning set in which the canonical patterns 34 within the spanning set collectively span only high-frequency patterns from the training data 13. The taxonomy module 11 ranks candidate canonical patterns 34 based on the frequency with which the training patterns that they dominate occur. After having ranked them, the taxonomy module 11 picks a spanning set whose members are canonical patterns 34 that collectively span some pre-determined percentage of the training patterns 50.

In some practices, the training module 11 relies on positional domination as a basis for identifying or extracting canonical patterns 34 from the training set 13. In positional domination, one starts with a canonical pattern 34 and compares it with a training pattern 50 using the alignment procedure carried out by the alignment module 28. The alignment module 28 provides the training module 11 with the number of insertions that were required to reach the candidate canonical pattern 34 starting with the training pattern 50. If the number of insertions is greater than some threshold value, the training module 11 rejects the possibility that the training pattern 50 in question belongs to a genus identified by the candidate canonical pattern 34. In practice, a threshold value of two, or at most three insertions has been found to result in an adequate set of canonical patterns 34.

In other practices, the alignment module 28 condenses the insertion of two or more semantic units so that the insertion of those semantic units is deemed to be only one insertion for purposes of evaluating a combination score 39. This insertion-condensation process relies on the fact that certain parts of speech can be made from combinations of semantic units that grammatically fulfill a particular role in a sentence. This can be viewed as the alignment module 28 carrying out alignment based on syntactic units instead of based on semantic units.

For example, given the sentence "The bug bled blood" one can derive a fundamentally similar sentence "The big black bug bled black blood." However, it would not make sense to regard "big black" as two insertions simply because it is made of two semantic units. In fact, "big black" collectively fills the role of an adjective. This procedure can thus be viewed as comparing the semantic backbone of a canonical pattern (i.e. subject:verb:object) with the semantic backbone of the training pattern (i.e., adjective:subject:verb:adjective:object). Thus, in this procedure, the letters "ABCD" in FIG. 5 represent syntactic units that make up the backbone of the canonical pattern 34 while the letters "AXBCD" are syntactic units that make up the backbone of the test pattern 32 or a training pattern 50.

What is claimed is:

1. An apparatus for extracting selected information of interest from an input data, comprising:
   a non-volatile program memory, for storing software instructions;
   a frame memory, for storing a frame having a canonical pattern indicating said selected information, wherein said canonical pattern comprises of a plurality of canonical units in a continuous canonical sequence, and each of the canonical units comprises at least one word, wherein said canonical pattern further comprises an index key, and said index key is a subset of said canonical units in said canonical sequence;
   a processor, for executing software instructions to implement following steps:
      retrieving an input pattern from said input data, wherein said input pattern comprises a plurality of input units in a continuous input sequence;
      determining whether said index key is in said input pattern;
      setting match result as unsuccessful and skipping following calculating steps and determining step if said index key is not presented in said input pattern;

proceeding to following calculating steps and determining step if said index key is presented in said input pattern;

calculating an alignment score by comparing said input pattern and said canonical pattern, wherein said alignment score indicates a likelihood of said input pattern matches said canonical pattern;

calculating a first combination score for further adjusting said alignment score if said input units comprises said canonical units in said canonical sequence and an inserted unit, wherein said inserted unit is inserted into said canonical sequence of canonical units, said first combination score corresponds to a first frequency in said frame for said inserted unit and a first adjacent leading unit in said canonical sequence, or to a second frequency in said frame for said inserted unit and a first adjacent trailing unit in said canonical sequence; and determining whether said selected information of interest is in said input data by comparing said alignment score with a threshold.

2. The apparatus of claim 1, wherein the processor further executes software instructions for calculating a second combination score for further adjusting said alignment score if said input pattern comprises said canonical pattern in said canonical sequence excluding a deleted unit, wherein said second combination score corresponds to a third frequency in said frame for said deleted unit and a second adjacent leading unit in said canonical sequence, or to a fourth frequency in said frame for said deleted unit and a second adjacent trailing unit in said canonical sequence.

3. The apparatus of claim 1, wherein at least one of the canonical units is a semantic unit for conveying meaning, wherein said frame further includes a topic slot indicating a subject matter associating with said semantic unit.

4. The apparatus of claim 2, wherein the processor further executes software instructions for statistical characterizing training data to generate said first frequency, said second frequency, said third frequency, and said fourth frequency, wherein said canonical pattern is extracted from said training data.

5. The apparatus of claim 2, wherein the canonical pattern further comprises a weight vector with a plurality of weights, each of the weights corresponds to one of said canonical units, respectively; and wherein said processor further executes software instructions to implement following steps:

producing a match vector of said input pattern, each element of said match vector indicates whether a corresponding canonical unit can be found in said input pattern;

calculating an inner product of said weight vector and said match vector as a baseline score; and adding said baseline score, said first combination score, and said second combination score as said alignment score.

6. The apparatus of claim 1, wherein said first combination score is negative if said first frequency or said second frequency is rare.

7. The apparatus of claim 6, wherein said first combination score is set to a negative magnitude to effectively place said alignment score below the threshold.

8. The apparatus of claim 2, wherein said first combination score or said second combination score is calculated based on a trigram.

* * * * *